June 7, 1949.  I. JEROME  2,472,299
UNIVERSAL MOTION AND STILL PICTURE CAMERA
Filed June 12, 1944
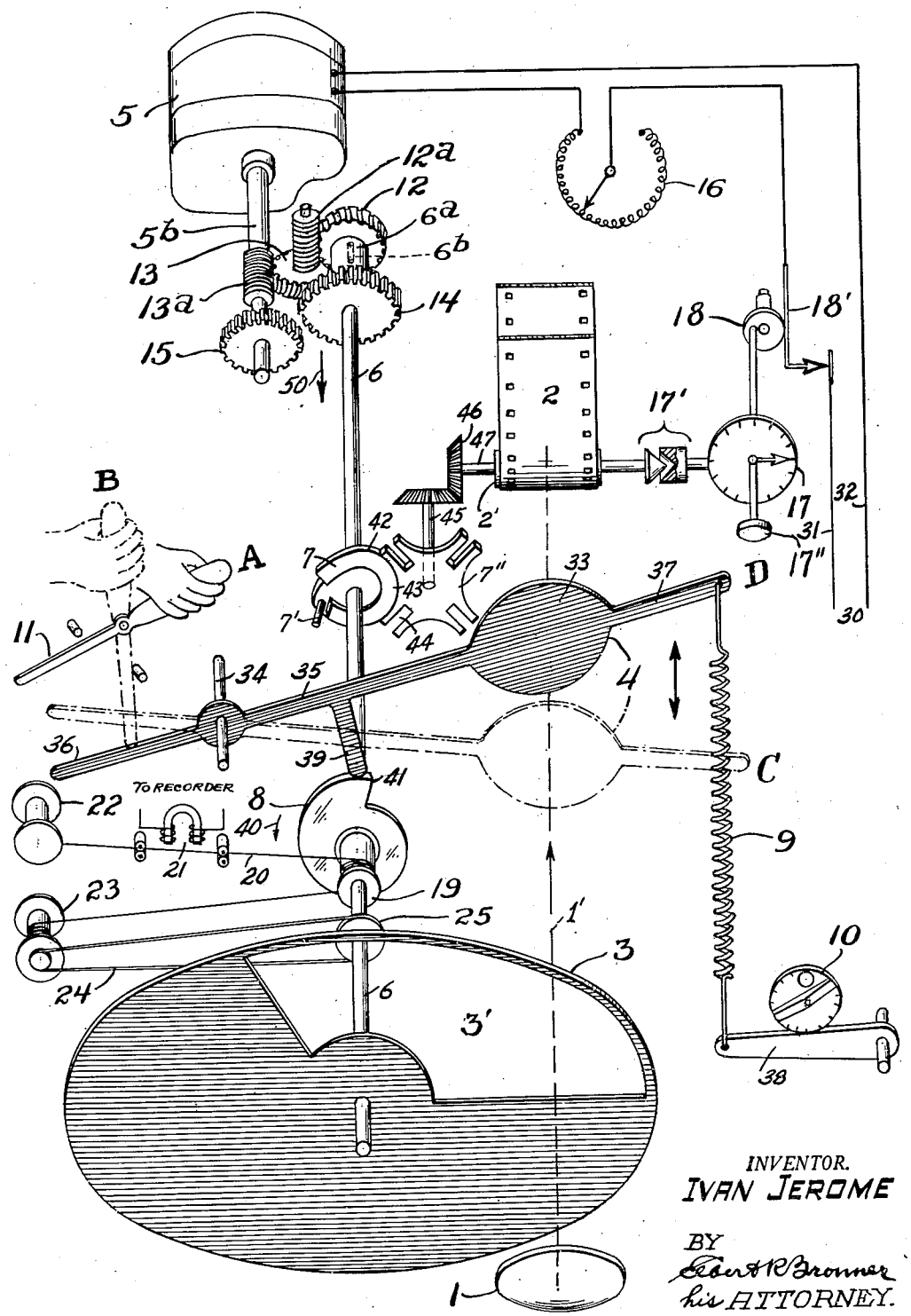
INVENTOR.
IVAN JEROME
BY
his ATTORNEY.

Patented June 7, 1949

2,472,299

UNITED STATES PATENT OFFICE 2,472,299

UNIVERSAL MOTION AND STILL PICTURE CAMERA

Ivan Jerome, Massapequa, N. Y.

Application June 12, 1944, Serial No. 539,908

4 Claims. (Cl. 88—18)

This invention relates to photographic cameras, and has for its main object to provide a device of this character which will be adapted to be changed to take motion pictures or still pictures, as desired, and such a change of taking the alternate pictures will be effected in a more efficient manner than similar photographic cameras do for this purpose at present.

Another object of this invention is to provide a photographic camera of the type indicated wherein one film will be provided for both, the motion pictures and the still pictures, one single driving mechanism for the film for both cases, said mechanism being adapted to be regulated for speed in the respective case in a simple, easy, and efficient manner, wherein a separate shutter is provided for each case, and the same driving mechanism will also control with its speed adjusting both shutters in a manner required for the taking of motion or still pictures, respectively.

Still a further object of my invention is to provide a camera, as characterized hereinbefore, in which means are provided to set the camera for a certain time unit for operation, and for a predetermined time unit for a rest period, said means being adapted to automatically and indefinitely successively interchange said operative and rest periods as long as desired.

Further objects of this invention will be apparent as the specification of the same proceeds.

The accompanying drawing, forming a part of this specification, is a diagram of my novel universal automatic camera, for both motion and still pictures, the parts thereof being indicated in a diagrammatic manner, and where not specifically shown, they are meant to be standard well known devices understood by those versed in this art.

Referring now to the drawings, more in detail by characters of reference, the numeral 1 indicates the lens of my camera, through which light rays 1' will penetrate the same and will strike, if unobstructed, the film 2 which is travelling in an intermittent motion and over the sprocket 2', as usual in such cameras.

As is well known in this art, the sprocket will cause the film 2 to travel in intermittent motion, having predetermined rest period and predetermined amounts of moving between them.

The motive power for my camera preferably is provided by an electric motor, indicated by the numeral 5, and receives its current from a source indicated at 30, having the electric wires 31 and 32, a rheostat 16, whereby intensity of the current and therethrough the speed of the motor may be controlled, and a switch 18' which is of the well known spring operated type, normally being open, while in the drawing it is shown in a closed position, as will be understood and explained hereinafter.

A main shaft 6 provides the motive power for the film 2 and also for the motion and control of the respective parts of my camera, like the two shutters, a certain timer device and also a certain sound recorder, if the addition of such a device to my camera is desired.

The motor 5 has a shaft $5^b$ driven at high speed as usual, and a specific changeable driving interconnection is provided between the motor shaft $5^b$ and the main shaft 6 of the camera.

As will be obvious, the main shaft 6 will have to be rotated at a comparatively slow speed when still pictures are taken, while the speed of it will greatly increase when motion pictures are to be taken. In the first case, when still pictures are to be taken, the driving interconnection between the motor shaft $5^b$ and the main shaft 6 will consist, in the embodiment shown in the drawings, of a worm $13^a$ on the motor shaft $5^b$ being in operative connection with worm wheel 13 on the shaft of which is arranged a second worm $12^a$ driving a second worm wheel 12, said second worm wheel 12 being fast on the main shaft 6. It will be seen that in this manner the high speed of the motor shaft $5^b$ will be twice greatly reduced through the two worm drives of the main shaft 6 which may be run at a very slow speed, in some cases only a few R. P. M., while the motor shaft is usually run at a high speed, let us say 10,000 R. P. M.

A rotary disk shutter 3 is secured on the main shaft 6 having an appropriately designed aperture 3' in the path of the light rays 1' when that portion of the rotary shutter 3 is in a position to face the lens 1.

It will be seen that when still pictures are to be taken, the rotary shutter 3 will run with comparatively low speed, and while allowed a predetermined time for the light rays to pass through the aperture 3' on to the film 2, it also will cut off said light rays in a slow manner. For this reason I employ a second shutter, indicated at 4, which is any of the so-called focal plane types, with appropriate mechanism to cause it to close and shut off the light rays 1' in a quick, spontaneous manner.

In the embodiment shown in the drawings, said shutter 4 is in the form of a plate or shutter proper 33, which is rockable on a pivot 34 being connected thereto by an arm 35. The arm has an extension 36 beyond the pivot 34 and the disk or shutter proper 33 has an arm extension 37 at the outer free end thereof. A coil spring 9 is hooked by its upper end in the outer arm 37, and by its lower end it is hooked into a rockable or pivoted arm 38 which is downwardly pressed and controlled by a cam device 10.

A cut out lever 11 is provided above the arm 36 at the inner end of the shutter device 4, the purpose and operation of which will be explained presently.

A specifically constructed cam 8 is secured on the main shaft 6, being in operative engagement with a transverse arm or extension 39, and, it will be seen that when the focal plane shutter 4 is permitted to operate, cam 8, rotating in the direction of arrow 40 will, through most of its circumference, engage the extension 39 and thereby push the focal plane shutter 4 in an upward direction into its position shown by full lines in the drawings and indicated by the letter D, while when the cam 8 arrives to the sudden drop 41 in its circumference, it will cease to support the extension 39 in its upward position, and will permit it to drop in a quick sudden manner downwardly under the influence of the stressed spring 9, and, in this manner, the shutter 4 will cut off the light ray 1' from the film in a desirable, quick manner, the shutter and its associated parts now being in the position indicated by dot and dash lines in the drawings, and characterized by the letter C.

The quickness of the closure of the focal plane shutter 4 in my camera may be adjusted by the cam 10, which, upon its rotation, and acting on the arm 38, may either stress and stretch the spring 9 in an increasing manner, or permit it to slacken, as will be obvious.

It also will be obvious that this play of the shutter 4 can take place only when the cut off device or arm 11 is in the position shown in the drawings by the full lines and indicated by the letter A, while, in case said cut off device 11 is placed in the position shown by the dotted lines and indicated by the letter B, the same will permanently press the outer arm extension 36 of the shutter 4 into a downward position and permanently lock the shutter 4, as shown in the drawings by full lines, in which position it permanently permits the light rays 1' to strike the film 2.

One embodiment of the intermittent driving connection between the shaft 6 and the sprocket 2' of the film, is shown by 7, 7' and 7" and its associated parts. As will be seen by inspecting the drawings, a second cam 7 is secured on the main shaft 6 at an appropriate place thereof, and a pin 7' projects in a predetermined position from said cam 7.

A so-called Geneva drive 7" is arranged in cooperative engagement with the cam 7, such drives being well known to those versed in this art, and, it will be seen that while the portion 42 of the cam is engaging the respective rounded portions 43 of the Geneva drive, said drive 7" will not move, but when the pin 7' arrives to it and engages a radial slot 44 therein, the Geneva drive 7" will be moved to a certain part of the rotation of the shaft 6 as long as pin 7' is engaged in the slot 44. Upon said pin leaving the slot 44, the rounded portion 42 will engage the next rounded part 43 of the Geneva drive and the said drive will, again, be in a resting, non-moving position.

It will be seen that through this arrangement the shaft 45 of the Geneva drive will make a partial rotation commensurate to the part of the rotation of the main shaft 6 while the pin 7" was in engagement with the respective slot 44, while said drive and its shaft 45 will remain at rest during the part of the rotation of the main shaft 6 while the rounded portion 42 of the cam 7 will engage the respective rounded portion 43 of the Geneva drive.

Now, a usual bevel gear connection 46 is arranged between the shaft 47 of the film driving sprocket 2' and of the intermittently moving and stopping shaft 45 of the Geneva drive, and, in this manner, sprocket 2' and the film 2, will be moved and stopped intermittently for time units determined by the speed of the shaft 6 and by the design of the interconnection between the same and the sprocket 2', just described.

When it is desired to take still pictures with my novel universal camera, the driving interconnection between the motor shaft $5^b$ and the main shaft 6 will be the one described hereinbefore and illustrated in the drawing as the active one, and in such a case, the cut off device 11 will be placed in position A shown by full lines.

It will be seen that in such a case the main shaft 6 will rotate with a comparatively slow speed and will alternately first lift or raise the focal plane shutter 4 and permit a picture to be taken on the respective portion of the film 2, and then allow said shutter 4 to very suddenly and spontaneously drop and shut off the light ray 1', whereby very clear and sharp still pictures may be taken.

The rotary shutter 3 will also rotate with the shaft 6 in a slow manner, and it will be obvious to those versed in this art, that the relation between the Geneva drive described hereinbefore, the cam 8, and the design of the rotary shutter 3, will be and can be made such that the aperture 3' will permit the light rays to strike the film 2 at the same time when shutter 4 will be opened.

When it is desired to take motion pictures, the driving interconnection between the motor shaft $5^b$ and the main shaft 6 will be changed, whereby the motor will drive the shaft 6 in a more direct manner, with a speed much less reduced than was the case with still pictures.

In the embodiment shown in the drawings, this is executed in a very simple manner, whereby a plain gear 15 will be secured at the outer end of the motor shaft $5^b$, and a corresponding gear 14 will be secured on the main shaft 6. Gear 14 is indirectly secured on the shaft 6, the same being carried by a sleeve $6^a$ slidable on the shaft 6, and preferably the same sleeve also will carry the second worm wheel 12. For causing the shaft to rotate with either of the gears, and for guiding the sliding motion of the sleeve $6^a$, a usual key and key slot $6^b$ may be provided.

When it is desired to take motion pictures with my camera, sleeve $6^a$ will be moved downwardly on the shaft 6, as indicated by the arrow 50, by any appropriate means well known in this art, until gear 14 will mesh with the gear 15, at the same time worm gear 12 leaving the worm $12^a$. Now, the motor will drive the shaft 6 more directly through the meshing gears 14 and 15 and the rate of transmission may be much less than before, and the speed of the shaft 6 greatly increased if necessary to amount to 2000–3000 R. P. M. in case the motor runs with a rate of revolutions of 10,000 R. P. M. The rotary shutter 3 will now run at a high speed and will take motion pictures through the aperture 3', as usual, while the focal plane shutter 4 will be permanently cut off through the device 11.

When, again, still pictures are to be taken, the driving interconnection between the motor shaft 5ᵇ and the main shaft 6 will be returned to the slow one by moving the sleeve 6ᵃ in an opposite direction.

My camera may also incorporate means whereby either motion pictures or still pictures may be taken for a predetermined length of time, then stopped for a desired time unit, and again operated and stopped automatically and alternately for any desired length of time. For this purpose I incorporate a timer device indicated at 17, which timer device may be any of the commercial timers. The purpose of this timer, as has been mentioned, will be to permit the operation of taking motion pictures or still pictures, as the case may be, for a predetermined length of time, then to automatically stop such taking, and then, again, automatically renew the taking of the picture for a predetermined interval, as long as the timer is operatively connected to the picture taking mechanism.

One important feature of this part of my invention is that the timer will act on the picture taking mechanism through the motor, stopping the motor when it is desired to stop taking the pictures, and starting the motor when the taking of the pictures is to be resumed. In this manner, a great saving in the use of electric current will be obtained and the wear and tear on the device will also be greatly reduced.

In the embodiment shown in the drawing, any releasable clutch mechanism 17' is placed into a driving connection between the sprocket 2' and the timer device 17. The timer device may operate a cam 18, said cam controlling the switch 18' and when it is desired to intermittently operate and stop my camera, clutch 17' will be closed. The timer 17 will be set as desired, that is, it will be set to a certain time during which it will permit the operation of the camera, and when that limit is reached through the intermediary of the clutch 17', the timer will permit the switch 18' to open, thereby stopping the motor 5, and therewith the whole operation of the camera, including the winding of the timer itself. When this stopping is effected, the timer will automatically return to its original position, as is usual with such timers, during that time switch 18' being left open, and when the timer arrives to its original starting position then it will again close the switch 18', the motor will start and the play will be repeated.

In this manner, the camera will operate for a predetermined time and a predetermined number of revolutions in the shaft 6 and number of pictures taken, after which it will stop to a predetermined period, defined by the setting of the timer, and then it will start again. In the rest periods, the circuit is broken, no current is used, and no part of the camera is in motion with the exception of the timer. As has been mentioned, such timers are well known in this art, and several of them may be appropriated for my purpose and the same is only shown in a diagrammatic manner in the drawings. At 17" I indicate, in diagrammatic manner, the setting or adjusting device for the timer.

At 19 I indicate a recording device which may be added to my camera. 19' is a spool on which is wound the recording wire 20, said wire being played out from the spool 22 and wound on the spool 23, as by the drive 24 and 25, from the main shaft 6. Wire 20 passes before a usual well known recorder 21 and taking the same off of the spool 23, it may be developed as it also is well known to experts in this art.

It will thus be seen that there is provided a device in which the several objects of this invention are achieved, and which is well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

What I claim as new and want to protect by Letters Patent of the United States is:

1. In a photographic camera, an operating shaft, means to intermittently move and stop the film at the rotation of said shaft, means to operate said shaft at a high speed, for motion pictures, or at a low speed, for still pictures, as desired, a rotary shutter on said shaft, a pivoted focal plane shutter, a resilient element acting on said focal plane shutter and having a tendency to place the same within the path of the light beam and quickly shut off the same, a cam on said operating shaft adapted to act on said focal plane shutter, normally having a tendency to place the same out of the path of the light beam but adapted to release it at a predetermined phase of its rotation and permit said resilient member to quickly close said shutter, both shutters operating when it is desired to take still pictures, and means to place said focal plane shutter into inactive position, out of the path of the light beam, when it is desired to take motion pictures; said focal plane shutter being movable on a pivoted arm, and the resilient means acting thereon being in the form of a coil spring, one end of said spring being secured to an arm pivoted on a stationary center, the other end of the same being secured to said pivoted arm carrying the focal plane shutter, and means to move said pivoted arm for the first end of said coil spring in one or in the other direction thereby to increase or decrease the tension on said shutter and the speed of its closing.

2. In a combination motion picture and still picture camera, a motor, an operating shaft, means to rotate said shaft by said motor, means to change the rate of transmission from said motor to said shaft whereby the shaft may be rotated at a predetermined high speed for taking motion pictures or at a lower speed for taking still pictures, a rotating disk shutter with an aperture therein secured on said shaft for taking motion pictures, a plane shutter to the rear of said rotating shutter for taking still pictures, spring means having a tendency to place said plane shutter within the path of the light beam, means on said operating shaft to place said plane shutter out of the path of the light beam against the action of said spring for most of the duration of each rotation of said shaft, said means however, permitting a quick closure of said shutter by said spring at a predetermined phase of every rotation of said shaft, and means to permanently place said shutter out of the path of the light beam, said plane shutter being carried on a pivoted arm, and one end of said spring acting thereon being secured to said arm, a pivoted lever to which the other end of said spring is secured and an eccentric disk acting on said lever whereby the tension of the spring may be adjusted.

3. In a combination motion picture and still picture camera, a motor, an operating shaft, means to rotate said shaft by said motor, means to change the rate of transmission from said motor to said shaft whereby the shaft may be rotated at a predetermined high speed for taking motion pictures or at a lower speed for taking still pictures, a rotating disk shutter with an aperture therein secured on said shaft for taking motion pictures, a plane shutter to the rear of said rotating shutter for taking still pictures, spring means having a tendency to place said plane shutter within the path of the light beam, means on said operating shaft to place said plane shutter out of the path of the light beam against the action of said spring for most of the duration of each rotation of said shaft, said means, however, permitting a quick closure of said shutter by said spring at a predetermined phase of every rotation of said shaft, and means to permanently place said plane shutter out of the path of the light beam, said plane shutter being carried by a pivoted arm acted upon by said spring, said means to place said plane shutter out of the path of the light beam during part of the rotation of its shaft, including a cam on said shaft, the major portion of its circumference being at a substantial distance from the center of the shaft, said arm resting on the circumference of said cam, said cam, however, having a portion closer to the center of the shaft and thereby permitting the operation of said spring and the closure of the aperture in the rotary shutter.

4. In a camera as set forth in claim 3, a film shaft the rotation of which is adapted to advance the film, a second cam on said operating shaft, an intermediate member between said two shafts adapted to be rotated by said second cam for a fraction of the time of the rotation of said operating shaft and means between said intermediate member and said film shaft, whereby the rotation of said intermediate member will correspondingly rotate the film shaft.

IVAN JEROME.

REFERENCES CITED

The following references are of record in the file of this patent:

UNITED STATES PATENTS

| Number | Name | Date |
|---|---|---|
| 491,993 | Edison | Feb. 21, 1893 |
| 934,894 | Depue et al. | Sept. 21, 1909 |
| 1,253,285 | Selig | Jan. 15, 1918 |
| 1,270,612 | Green | June 25, 1918 |
| 1,272,798 | Green | July 16, 1918 |
| 1,759,630 | Rinaldy | May 20, 1930 |
| 1,866,712 | Jones | July 12, 1932 |
| 1,891,738 | Thomas | Dec. 20, 1932 |
| 1,986,398 | Ireland | Jan. 1, 1935 |
| 2,028,977 | Gower | Jan. 28, 1936 |
| 2,033,825 | Guest | Mar. 10, 1936 |
| 2,048,439 | Fairchild | July 21, 1936 |
| 2,051,519 | Cole | Aug. 18, 1936 |
| 2,156,440 | Veber | May 2, 1939 |
| 2,294,597 | Gillespie et al. | Sept. 1, 1942 |
| 2,353,154 | Fowler | July 11, 1944 |
| 2,375,602 | Wickhaw | May 8, 1945 |

FOREIGN PATENTS

| Number | Country | Date |
|---|---|---|
| 152,286 | Great Britain | Jan. 13, 1921 |
| 625,196 | France | Aug. 4, 1927 |